April 21, 1953   C. CHRISTIANSEN   2,635,884
DEVICE FOR LOADING, TRANSPORTING, AND UNLOADING MATERIAL
Filed March 29, 1949   2 SHEETS—SHEET 1
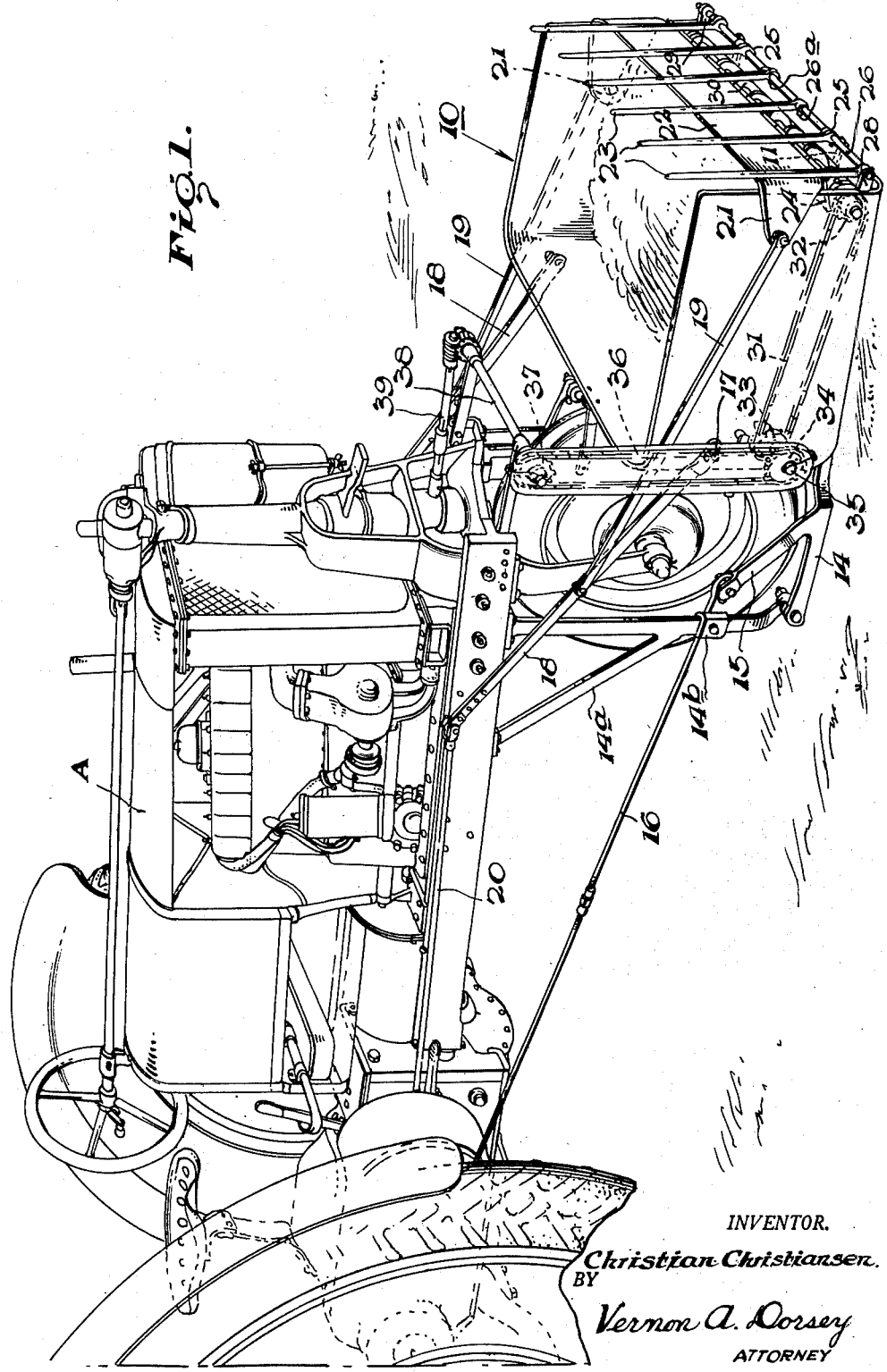
INVENTOR.
Christian Christiansen.
BY
Vernon A. Dorsey
ATTORNEY

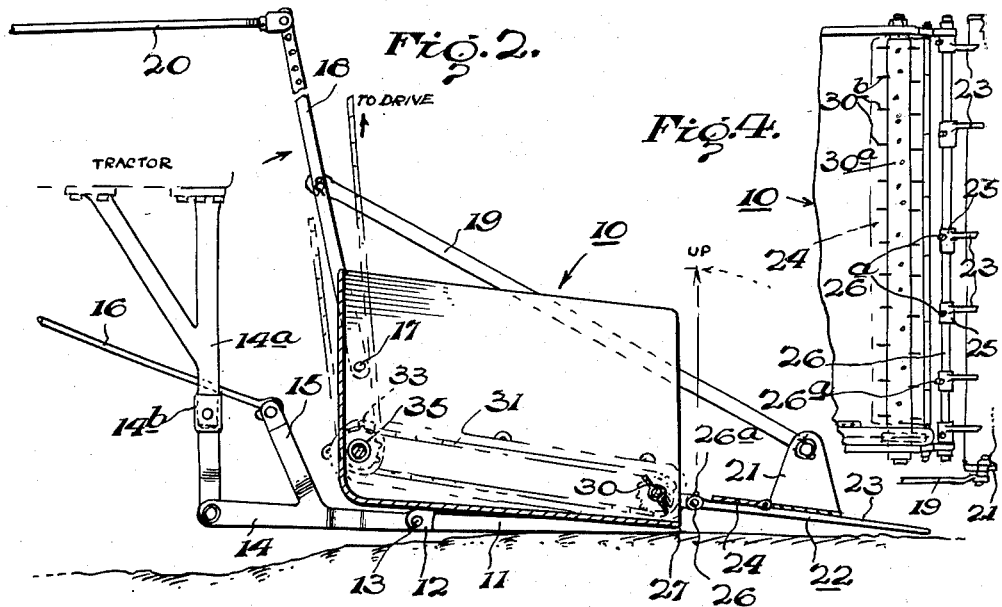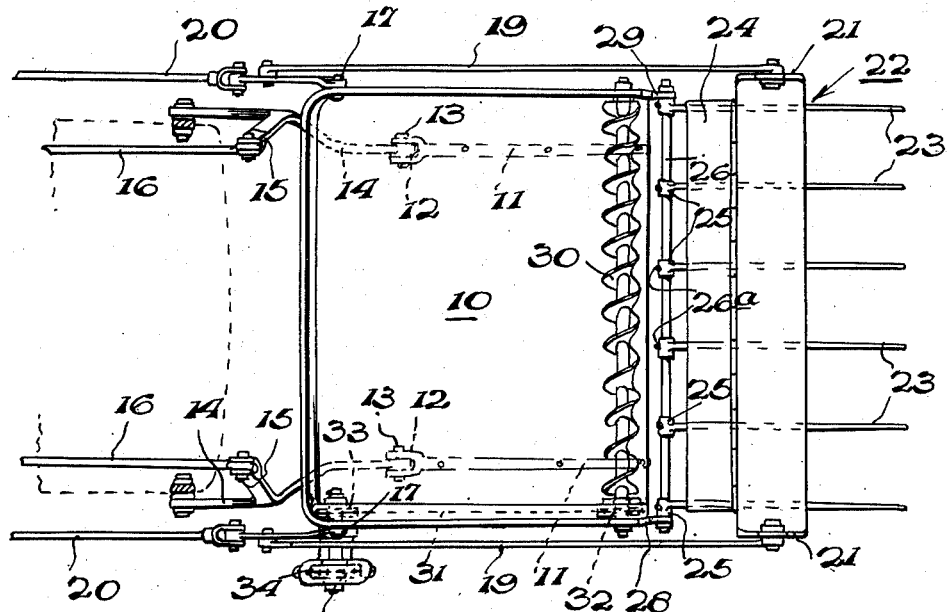

Patented Apr. 21, 1953

2,635,884

UNITED STATES PATENT OFFICE 2,635,884

DEVICE FOR LOADING, TRANSPORTING, AND UNLOADING MATERIAL

Christian Christiansen, St. Cloud, Minn.

Application March 29, 1949, Serial No. 84,026

3 Claims. (Cl. 275—1)

The present invention relates generally to devices for loading, transporting and unloading materials, and more particularly to an attachment for vehicles, such as tractors for loading and unloading hay, fertilizer, rubbish and many other materials.

The need for a one-man operated simple, durable and economical attachment unit for tractors or the like adapted to serve the combined purposes of loading, transporting or unloading materials from one location to another has long been in demand by farmers, builders and others requiring such apparatus.

The principal object of this invention is to provide a simple novel attachment unit for tractors or the like, whereby loading, transporting and unloading is readily accomplished by one man driving a tractor or other vehicle to which the device is attached.

Another object is to provide a combined tractor pushed material handling attachment constructed to mechanically load, transport and unload materials by spreading the materials unloaded over a field or other surface to be treated therewith.

Many other objects and advantages of the present invention will be readily apparent to one reading the following specifications and claims with reference to the accompanying drawings.

In the drawings wherein the several parts of the device are given identifying reference characters:

Fig. 1 is a general perspective view of the present invention applied to the front of a tractor.

Fig. 2 is a side elevational view of the material holding body mountings and loading fork gate and of the material holding body in cross section.

Fig. 3 is a top plan view of the device with the loading fork gate down as shown in Fig. 2.

Fig. 4 is a modified form of the invention showing the auger replaced by a toothed cylinder, which may be interchangeable with the auger.

Referring to the drawings and first with particular reference to Figs. 1 and 3, the device comprises a material holding body 10 having a flat bottom mounted on longitudinal bars 11 and a plurality of members adapted to load or unload the same hereinafter described. The bars 11 extend from the mouth of the material holding body 10 and are made with bifurcated ends 12 each formed with openings to receive a transverse pivot pin 13. The pins 13 pivotally connect the bifurcated ends 12 with pusher arms 14, which pivotally connect to supports 14a formed with a knuckle joint 14b at each side of a vehicle frame or chassis, such for example as a tractor A.

The material handling body arms 14 are each formed with a lever arm 15 rigidly connected or formed integrally from an intermediate point on the arms 14 so as to provide a bell-crank arrangement. The free end lever 15 of each arm 14 is formed with an aperture for connection to a rod 16 leading to a hand operated lever, not shown, on the tractor or other vehicle on which the material molding body 10 is mounted.

At the rear of each side of the material holding body 10 just below the upper rim thereof are pins or stub axles 17. Pivotally mounted on each of these axles 17 are the ends of elongated levers 18, to intermediate points of which are pivotally connected the ends of the elongated links 19. The free ends of levers 18 are coupled to rods 20, which lead to an operating lever adjacent to the operating lever, not shown, for operating the lever arms 15.

It is, of course, to be understood that in place of rods 16 and 20, hydraulic mechanism may be used, that is, the piston shafts of hydraulic cylinders, not shown, may be coupled to the levers 15 and 18. However, whether the actuating means is by rods and levers or hydraulic means, the operation of the material holding body 10 and the loading and unloading means is basically the same as will hereinafter be fully explained.

The elongated links 19 extend from their pivotal connections on the levers 18 angularly along each side of the material holding body 10 and each couples to a triangular ear 21 formed at substantially right angles from a gate 22.

The gate 22 is formed with tines 23 and is hereinafter called a loading fork gate. The rear longitudinal edge of the loading fork gate 22 is made with a pivoted flange or flap 24. Apertured tine-supporting lugs 25 are secured to shaft 26 by set screws 26a. Shaft 26 is pivotally mounted between lugs 28 and 29 extending from each side wall of the mouth of the material holding body 10.

These lugs 28 and 29 are made long enough to permit the pivoted flange 24 to clear the top of an unloading worm or auger 30 journalled for rotation in the sides of the material holding body 10 when the loading fork gate is raised. The unloading auger 30 is positioned just back of the leading edge 27 of the material holding body, see Figs. 2 and 3. This unloading auger 30 is driven from the power take-off of a tractor in any suitable manner, for example, as shown by a chain 31 and sprocket wheels 32, 33 and 34. The sprocket wheel 32 is keyed to an extension of the auger shaft exteriorly of one side of the material holding body 10, and the sprocket wheel 33 is keyed to a transverse shaft rotatably mounted on the material holding body on stub shaft 35, which carries the sprocket 34 and one loop of chain 36 to sprocket 37.

The sprocket 37, see Fig. 1, is keyed to worm shaft 38 and is driven by the power take-off shaft 39 of the tractor.

In place of the auger 30, it may be more effective to use a cylinder 30a having a plurality of projecting teeth $30^b$. Such a cylinder may be interchangeable with the auger 30 and is used for discharging roughage or the like.

Operation

The operation of the tractor attachment is very simple and its many uses make this invention very popular with the farmer. For example, it may be used to pick-up and load hay, fertilizer, rubbish and materials of all descriptions for transportation from one location to another. Then after arriving at the new location the unloading auger 30 or the toothed cylinder $30^a$ will automatically unload the material. Then, also, if it is fertilizer being unloaded the auger 30 or cylinder $30^a$ will distribute the material while the tractor is moving slowly over the field.

In actual use the material holding body 10 is pushed forward in front of the tractor by arms 14. To pick up a load the lever 18 is pulled rearwardly, assuming the loading fork gate 22 is down adjacent the ground surface and has engaged under some material to be loaded, and the gate 22 is swung upward. The upward swing throws the material back into the material holding body. This operation is repeated, until the material holding body 10 is loaded to capacity.

After the material holding body 10 is loaded it may be raised by a continued pull on lever 18, which pull will if continued impart pull to the bell-crank arrangement through arm 15 to raise the material holding body 10 still higher with respect to the ground. The tractor may now be moved to an unloading location and operation of auger 30 started by clutching the same to the power take-off. The auger 30 or cylinder $30^a$ will convey the material from the material holding body under the pivoted flange 24 over the loading edge 27 to the ground.

Thus, the present invention provides a novel vehicle attachment adapted to load, transport and unload many kinds of materials from one location to another.

While only one practical embodiment of construction and arrangement and combination of the parts is illustrated, it is to be expressly understood that the same does not limit the scope of this invention, as changes and modifications will now appear to others skilled in this art within the scope of the appended claims.

What is claimed is:

1. A loading and unloading material transporting attachment for tractors and the like, comprising a material holding body, said body having a bottom, upright side walls and a rear wall, with an open top and an open front, a loading fork gate pivotally mounted adjacent the side walls of the material holding body across the leading edge of the bottom of the material holding body, said loading fork gate comprising a transverse shaft forming the said pivotal mounting means for the loading fork gate and a series of spaced tines attached to said transverse shaft with means for raising and lowering the loading fork gate over its pivotal mounting to load the material into the material holding body, said means comprising a linkage system originating adjacent the driver's seat of the tractor, and an unloading means for the material in the body comprising a rotatable conveyor located above the bottom of the material holding body adjacent the leading edge of the bottom and the pivotal mountings for the loading fork gate, said rotatable unloading means being actuated by the power take-off of the tractor when the material loading fork gate is stationary and in a position in which the tines thereof form an extension of the bottom of the material holding body.

2. A loading and unloading material transporting attachment for tractors and the like, comprising a material holding body, said body having a bottom, upright side walls and a rear wall, with an open top and an open front, a loading fork gate pivotally mounted adjacent the side walls of the material holding body across the leading edge of the bottom of the same, said loading fork gate comprising tines connected intermediate their ends by a flat connecting member, a flap pivotally connected to said connecting member, and a transverse shaft forming the said pivotal mounting means for said loading fork gate, means for raising and lowering the loading fork gate over its pivotal mounting for loading the material into the material holding body, and an unloading means for the material in the body comprising an auger conveyor located above the bottom of the material holding body adjacent the leading edge of the bottom and the pivotal mountings for the loading fork gate, said auger unloading means being actuated by the power take-off of the tractor when the material loading fork gate is stationary and in a position in which the tines thereof form an extension of the bottom of the material holding body, and means controlled by the tractor driver for raising and lowering the material holding body in respect to the ground.

3. A loading and unloading material transporting attachment for tractors and the like, comprising a material holding body, said body having a bottom, upright side walls and a rear wall, with an open top and an open front, a loading fork gate pivotally mounted adjacent the side walls of the material holding body across the leading edge of the bottom of the same, said loading fork gate comprising a transverse shaft forming the pivotal mounting means for the loading fork gate, and a series of detachable spaced tines connected to said transverse shaft, means for moving the loading fork gate over its pivotal mounting to load the material holding body, an unloading means for the material in the body comprising a rotatable conveyor located above the bottom of the material holding body parallel to the leading edge of the same and adjacent the pivotal mountings for the loading fork gate, said rotatable unloading means being actuated by the power take-off of the tractor when the material loading fork gate is stationary and in a position in which the tines thereof form an extension of the bottom of the material holding body and means controlled by the tractor driver for raising and lowering both the material holding body and the loading fork gate in respect to the ground.

CHRISTIAN CHRISTIANSEN.

References Cited in the file of this patent

UNITED STATES PATENTS

| Number | Name | Date |
| --- | --- | --- |
| 684,911 | Collins | Oct. 22, 1901 |
| 716,934 | Porter | Dec. 30, 1902 |
| 775,357 | Waddell | Nov. 22, 1904 |
| 1,346,433 | Varland | July 13, 1920 |
| 1,624,210 | Bruce | Apr. 12, 1927 |
| 1,742,798 | Zajkowski | Jan. 7, 1930 |
| 1,979,945 | Kranick | Nov. 6, 1934 |
| 2,254,690 | Love | Sept. 2, 1941 |
| 2,488,695 | Upton | Nov. 22, 1949 |